United States Patent [19]
Overdijk et al.

[11] 3,871,869
[45] Mar. 18, 1975

[54] PROCESS FOR PRESSING BRIQUETTES FROM POWDERED SUBSTANCES MORE PARTICULARLY FROM FINE-GRAINED FLUORSPAR AND BRIQUETTES THUS OBTAINED

[75] Inventors: Willem B. Overdijk, Velsen; Adam Steen, Heemskerk, both of Netherlands

[73] Assignee: Hoogovens Ijmuiden B.V., Ijmuiden, Netherlands

[22] Filed: July 3, 1973

[21] Appl. No.: 376,161

[30] Foreign Application Priority Data
Oct. 2, 1972 Netherlands.................. 7201775

[52] U.S. Cl.............................. 75/53, 75/3, 106/90
[51] Int. Cl......... C21c 7/00, C21b 1/08, C04b 7/02
[58] Field of Search.................. 75/3–5, 53–57; 106/90, 92; 264/228

[56] References Cited
UNITED STATES PATENTS

| | | | |
|---|---|---|---|
| 3,216,078 | 11/1965 | Zrimsek | 75/53 |
| 3,374,085 | 3/1968 | Stone | 75/3 |
| 3,681,050 | 8/1972 | Kazufusa | 75/53 |
| 3,681,051 | 8/1972 | Takashima | 75/53 |

*Primary Examiner*—C. Lovell
*Assistant Examiner*—Peter D. Rosenberg
*Attorney, Agent, or Firm*—Stevens, Davis, Miller & Mosher

[57] ABSTRACT

A process for producing a fine-ground fluorspar in briquette form in which the fine-ground fluorspar is intimately mixed with from 0.5 to 6% by weight of molasses after which the mixture is further mixed with from 0.5 to 5% by weight of cement at room temperature and the resultant mixture is compressed into briquettes.

7 Claims, No Drawings

PROCESS FOR PRESSING BRIQUETTES FROM POWDERED SUBSTANCES MORE PARTICULARLY FROM FINE-GRAINED FLUORSPAR AND BRIQUETTES THUS OBTAINED

The present invention relates to a process for pressing briquettes from powdered substances, more particularly from fine-grained fluorspar, using a binder comprising cement. Fluorspar is added to the slag in a steel convertor in order to render the slag more fluid. Fluorspar is added to the slag in the form of pieces. The last few years coarse-grained fluorspar has been scarce on the world market. The addition of fine-grained fluorspar to a steel convertor is not feasible, inasmuch as the fine-grained fluorspar would be entrained by the gases having the disadvantages of a fluctuating yield as regards the measured quantity and an additional loading of the gas dedusting plant.

In accordance with the present invention fine-grained fluorspar is pressed in the form of briquettes while using as binder 0.5 to 6% by weight of molasses and 0.5 to 5% by weight of cement.

More specifically, 0.5 to 6% by weight of molasses is added to a quantity of fine-grained fluorspar having a particle size of at most 4 mm, the resulting mixture is intimately mixed, whereupon 0.5 to 5% by weight of cement is added thereto and, at room temperature, the mixture is then pressed in the form of briquettes in a briquette press.

It is remarked that both molasses and cement are binders known as such. It is surprising, however, that a combined application thereof leads to a satisfactory initial strength of the briquettes thus manufactured without the necessity of an appreciable drying period (so that interstage storage has become superfluous), while the quantity required of each of the binders may be considered to be exceptionally small. The particle size of the fluorspar is not critical; the aforementioned limit of 4 mm is the practical maximal limit for a satisfactory briquetting operation and is also based on the grounds that a smaller sized particle is blown out of the convertor by the gas flow.

Coarse-grained fluorspar, especially after having been crushed to a convenient size for handling, comprises a large quantity of fine-grained fluorspar (approximately 10 to 20%). This fine-grained fluorspar can be removed by sieving and can be pressed into briquettes in the aforementioned manner, which is economical and ergonomical advantage.

The invention will now be explained in more detail with reference to an example.

EXAMPLE 100 kg of fine-grained fluorspar having an haphazard particle configuration, but a particle size not exceeding 4 mm, was intimately mixed with 4 kg of sugar syrup or molasses. After mixing, 2 kg of blast furnace cement was added thereto and thoroughly mixed therewith. At room temperature the mixture thus obtained was pressed into briquettes in a conventional briquette press. The pressure between the rollers amounted to approximately 500 kg/cm². The addition of a small quantity of cement to the molasses/fluorspar mixture resulted in a substantially instantaneous binding of the mixture.

After a few minutes the briquettes thus obtained had sufficient strength mechanically to be transported and bunkered. Presumably the briquettes are toughened to a certain extent by the molasses, so that breaking of the briquettes on being dropped immediately upon pressing is avoided; with a drop of approximately 8 m at least the briquettes remained intact. After 24 hours of air hardening the cold compression strength amounted to an average of 96 kg. In addition to this it appeared that the briquettes had a high crushing resistance against crushing.

The furnace charges of steel were prepared in a steel convertor, the fluorspar briquettes obtained being used as an addition. The measured quantities of fluorspar briquettes used equalled the prescribed amount of lump fluorspar. In comparison with five furnace charges preceding the 10 test furnace charges and the five furnace charges following them, dephosphorizing and desulphurizing proceeded in a similar or more favourable manner, which may be explained by the smaller amount of fine-grained fluorspar present, on account of which lesser quantities are lost by being blown away.

A great number of advantages result from the application of the fluorspar in the form of briquettes:

- fine-grained fluorspar is less expensive than lump fluorspar;
- the briquettes are less expensive than lump fluorspar;
- by pressing the fluorspar into briquettes accurate measuring of the quantity is possible;
- the fluorspar yield is increased because less fluorspar escapes through the chimneys;
- control of environment pollution by avoiding the ejection of fluorspar in the form of dust;
- the composition of the steel charge to be prepared approximates the required value more closely;
- an additional heat treatment when pressing the fluorspar in the form of briquettes has become superfluous;
- the particle configuration of the starting material is no longer critical;
- inexpensive binders;
- an article having a uniform size and composition;

The present invention should not be considered to be limited to the application of fluorspar briquettes. It is possible to press the convertor and ladle additions, such as ferro-manganese, ferro-silicon and possible other non-ferrous metals into briquettes in the same manner. Calcium flux-mixtures and colemanite can successfully be pressed into briquettes in the aforementioned manner as well.

What is claimed is:

1. A process for producing pressed briquettes comprising mixing powdered fluorspar with from 0.5 to 6% by weight of molasses and 0.5 to 5% by weight of cement and compressing the resultant mixture into briquettes.

2. The process according to claim 1, in which the powdered fluorspar has a particle size of at most 4mm and the molasses is intimately mixed with the fluorspar after which the cement is mixed with the molasses and fluorspar at room temperature.

3. The process according to claim 2, in which 4% by weight of molasses and 2% by weight of cement is utilized.

4. The process according to claim 1, in which the material is pressed into briquettes with the aid of a briquette roller.

5. Pressed briquettes comprising fine-grained fluorspar, from 0.5 to 6% by weight of molasses and 0.5 to 5% by weight of cement.

6. A process for adding fluorspar to the contents of a convertor or casting ladle, comprising passing the fluorspar to the convertor or casting ladle in the form of briquettes, which are composed of fine-grained aggregates with as binder 0.5% to 6% by weight of molasses and 0.5% to 5% by weight of cement.

7. A process for producing pressed briquettes from powdered substances selected from the group consisting of ferro-manganese, ferro-silicon, calcium flux-mixtures and colemanite comprising mixing said powdered substance with from 0.5 to 6% by weight of molasses and 0.5 to 5% by weight of cement and compressing the resultant mixture into briquettes.

* * * * *

UNITED STATES PATENT OFFICE
CERTIFICATE OF CORRECTION

PATENT NO. : 3,871,869
DATED : March 18, 1975
INVENTOR(S) : Willem B. OVERDIJK; Adam STEEN It is certified that error appears in the above-identified patent and that said Letters Patent are hereby corrected as shown below:

Cancel:

"[30]  Foreign Application Priority Data
      Oct. 2, 1972   Netherlands.............7201775"

Signed and Sealed this second Day of September 1975

[SEAL]

Attest:

RUTH C. MASON
Attesting Officer

C. MARSHALL DANN
Commissioner of Patents and Trademarks